US006291064B1

(12) United States Patent
Kadowaki et al.

(10) Patent No.: US 6,291,064 B1
(45) Date of Patent: Sep. 18, 2001

(54) FIBER REINFORCED THERMOPLASTIC RESIN MOLDED PRODUCT HAVING A GOOD SURFACE APPEARANCE

(75) Inventors: Ryosaku Kadowaki; Koichi Hashimoto; Toshihiro Asai; Toshiaki Okumura, all of Kobe (JP)

(73) Assignee: Kabushiki Kaisha Kobe Seiko Sho (Kobe Steel Ltd.), Kobe (JP)

( * ) Notice: Subject to any disclaimer, the term of this patent is extended or adjusted under 35 U.S.C. 154(b) by 0 days.

(21) Appl. No.: 09/353,137

(22) Filed: Jul. 14, 1999

(30) Foreign Application Priority Data

Jul. 24, 1998 (JP) .................................................. 10-209970

(51) Int. Cl.$^7$ ........................................................ B32B 5/16
(52) U.S. Cl. ........................... 428/332; 428/221; 428/364; 428/401; 428/292
(58) Field of Search ..................................... 428/221, 332, 428/335, 292, 359, 364, 392, 400, 401; 501/88, 32, 89, 87, 95

(56) References Cited

U.S. PATENT DOCUMENTS 4,626,515 * 12/1986 Chyung et al. ........................ 501/32
5,079,196 * 1/1992 Arfsten et al. ........................ 501/95

* cited by examiner

*Primary Examiner*—Merrick Dixon
(74) *Attorney, Agent, or Firm*—Oblon, Spivak, McClelland, Maier & Neustadt, P.C.

(57) ABSTRACT

A fiber reinforced thermoplastic resin molded product having a good surface appearance; fiber reinforced thermoplastic resin pellets useful for making fiber reinforced thermoplastic resin molded products; and processes for making fiber reinforced thermoplastic resin molded products and processes for producing fiber reinforced thermoplastic resin pellets.

6 Claims, No Drawings

FIBER REINFORCED THERMOPLASTIC RESIN MOLDED PRODUCT HAVING A GOOD SURFACE APPEARANCE

BACKGROUND OF THE INVENTION

1. Field of the Invention

The present invention relates to fiber reinforced thermoplastic resin molded products having excellent mechanical properties and a good surface appearance, fiber reinforced thermoplastic resin pellets and the methods of producing such pellets useful for producing such products. The present invention further relates to the methods of producing the molded product having a good surface appearance, using the pellet.

The molded product of the present invention can be used in various fields as follows: motorcar interiors such as a console box, an instrument panel and a trim; motorcar exteriors such as a bumper, a fender, a front grill, a rear spoiler and a side protector; motorcar-related members such as members inside an engine room, for example, a fan, a fan shroud, a battery tray and a fuse box; housings for electrical equipment such as a notebook-sized personal computer and a portable telephone; structural members of electric appliances; office furniture; building materials; and containers.

2. Description of Related Art

A fiber reinforced thermoplastic resin in which its matrix is a thermoplastic polymer and its reinforcing fibers are glass fibers has widely been used, exclusively in a pellet form, as a material for injection molding making mass production possible. As pellets containing glass fibers, there are known a short fiber reinforced thermoplastics pellet (a compound pellet) obtained by melting and compounding chopped glass fibers having a length of 3–12 mm and a matrix thermoplastics polymer in an extruder, extruding the blend into a strand form, and cutting the resultant, and a long fiber reinforced thermoplastics pellet obtained by causing continuos glass fibers tow to pass through a melted matrix thermoplastics polymer bath to impregnate the tow with the melted resin, pulling out and cooling the tow into a strand form and then cutting the strand.

Concerning the short fiber reinforced thermoplastics pellet, its glass fibers are damaged in the melt compounding step, so that the length of the fibers in the actually-obtained pellet becomes far shorter than that of the fibers before the compounding. The fibers are also damaged in injection molding. Thus, the weight average fiber length (Lw) of an injection-molded product using such a short fiber reinforced thermoplastics pellet is reduced to about 0.3–0.6 mm. The glass fibers, therefore, do not become entangled with each other so that reinforcing effect is not exhibited, resulting in poor mechanical properties.

In the long fiber reinforced thermoplastics pellet, since its fibers are not damaged during the production thereof, which is different from the short fiber reinforced thermoplastics pellet, an injection-molded product having satisfactory mechanical properties can be obtained. However, the length of the fibers causes the dispersibility of the fibers to deteriorate, resulting in such appearance badness that the fibers bundle is in sight from the surface of the product.

In particular, when a method is used where a master pellet having high concentration of its glass fibers is mixed with a pellet containing only a matrix thermoplastics polymer and does not contain any glass fiber at the time of molding so as to make up the contained amount of the glass fibers to a given value, causing a problem where appearance badness resulting from non-uniform dispersion of the glass fibers comes into prominence.

Thus, investigations have been made for dispersing glass fibers uniformly by setting up an especial blending nozzle onto a molding machine, making a gate of a mold narrow, or setting the backpressure of a screw at the time of molding to a high value. However, such manners for enlarging shearing force in blending and injection steps are not very effective for an improvement in the dispersibility of the fibers. Conversely, the fibers are unfavorably damaged.

From the viewpoint that it is preferable for an improvement in dispersibility of glass fibers to get the glass fibers in the state of a monofilament sufficiently wet with a matrix thermoplastics polymer, a method of getting the glass fibers wet with the matrix thermoplastics polymer in the process of producing a pellet is disclosed (Japanese Patent Application Laid-Open No. 3-13305). However, the improvements in the dispersibility of the fiber and a surface appearance are unsatisfactory.

Japanese Patent Application Laid-Open No. 5-239286 discloses a method of specifying the MI (melt index) of a matrix thermoplastics polymer and the blend ratio of the resin to glass fibers to raise dispersibility of the fiber and reduce the damage of the fibers. Japanese Patent Application Laid-Open No. 5-124036 discloses a method of using a resin having a lower melting viscosity as a master pellet of a high glass fiber content, and using a resin having a higher melting viscosity as a pellet not containing any glass fiber, to raise dispersibility of the glass fibers and mechanical properties of a molded product.

In these methods in the prior art, the surface appearance of a molded product can be improved to some degree, and there are not brought such bad results that the glass fibers are projected from the surface of the product. However, the dispersibility of the glass fibers is not completely improved, so that the glass fibers may be present in a bundle form near the surface of the product. If the product includes pigments and dyes and the glass fibers tow is present near its surface, the concentration of the colored resin is small at the area where the tow is present. Thus, the color becomes uneven so as to result in appearance badness. In other words, even when the glass fiber is not in sight from the surface, appearance badness such as color unevenness cannot be overcome if the glass fibers are non-uniformly dispersed. Furthermore, if the glass fibers are non-uniformly dispersed and the glass fibers tow is locally present, physical properties such as mechanical properties of the product are aversely influenced. Accordingly, there remain problems that physical properties vary between lots of injection-molded products or between locations of the same molded product.

SUMMARY OF THE INVENTION

An object of the present invention is to provide a fiber reinforced thermoplastic resin molded product wherein the dispersibility of glass fibers in a matrix thermoplastics polymer is improved and the glass fibers tow is prevented from being present after molding as much as possible, to exhibit a good surface appearance with improved, less-fluctuated mechanical properties.

Another object of the present invention is to provide a pellet for obtaining a molded product having such a good surface appearance with improved, less-fluctuated mechanical properties.

Still another object of the present invention is to provide preferable methods for producing the molded product and the pellet.

The fiber reinforced thermoplastic resin molded product of the present invention comprises a thermoplastic resin as a matrix polymer and glass fibers as reinforcing fibers, and has a good surface appearance, wherein the glass fibers are contained in an amount of 2 to 20 vol % of the molded product, the weight average fiber length (Lw) of the glass fibers present in the molded product is from 0.8 to 1.8 mm, the glass fibers of 2 mm or more in length are contained in an amount of 20 or less wt % of the total glass fibers, and the glass fibers of 3 mm or more in length are contained in an amount of 5 or less wt % of the total glass fibers.

The molded product of the present invention satisfying the above-mentioned requirements has a very good surface appearance, and its glass fibers are uniformly dispersed to exhibit good mechanical properties. Moreover, the scattering in properties depending on locations and lots of the molded product can be reduced.

One of preferred processes for producing the molded product of the invention is a process of blending a master pellet which contains a great deal of the glass fibers with a pellet which does not substantially contain any glass fiber to be used. The master pellet is preferably the following pellet of the present invention.

The fiber reinforced thermoplastic resin pellet of the present invention comprises a thermoplastic resin as a matrix polymer and glass fibers as reinforcing fibers, wherein the length of the pellet is about 2 to 12 mm, the glass fibers having substantially the same length as the pellet is contained in an amount of 20 to 60 vol % of the total pellet, in the state of aligned or twisted fibers along the longitudinal direction of the pellet, and $L/D^2$ is 0.45 or more and L/D is from 1.1 to 6 wherein L represents the length of the pellet and D represents the diameter thereof. This pellet is blended with a resin pellet which does not substantially contain any glass fiber, and then the blend can be injection-molded to produce the above-mentioned molded product.

The above-mentioned fiber reinforced thermoplastic resin pellet (referred to as pellet A) may be blended with a thermoplastic resin pellet which does not substantially contain any glass fiber (referred to as pellet B), in the manner that the weight ratio of A to B is from 0.08 to 3. Preferably, the resultant blend, which is included in the scope of the present invention, is used.

In order to produce the molded product of the present invention, there is preferably used a process wherein the fiber reinforced thermoplastic resin pellet A is mixed with a thermoplastic resin pellet B which does not substantially contain any glass fiber, in the manner that the weight ratio of A to B is from 0.08 to 3, and then the blend is injection-molded. In this case, the pellet A and the pellet B are preferably selected in such a manner that a thermoplastic resin constituting the fiber reinforced thermoplastic resin pellet A flows more easily than a thermoplastic resin constituting the thermoplastic resin pellet B which does not substantially contain any glass fiber, in order to make the dispersibility of the glass fibers better.

A preferred process for producing the fiber reinforced thermoplastic resin pellet A continuously, comprises the steps of:

immersing continuous long glass fibers tow into a melted matrix thermoplastics polymer bath and causing the tow to pass through the bath, thereby impregnating the glass fibers tow with the matrix thermoplastics polymer, rotating the continuous long glass fibers tow continuously around the center axis of the tow with a twister, thereby twisting the tow to prepare a fiber reinforced strand, and pulling out the fiber reinforced strand in which the twisted tow is impregnated with the matrix thermoplastics polymer, and cutting the strand into pieces having a predetermined length, thereby obtaining the pellet.

DESCRIPTION OF THE PREFERRED EMBODIMENTS

The fiber reinforced thermoplastic resin molded product of the present invention comprises a thermoplastic resin as a matrix polymer and comprises glass fibers as reinforcing fibers.

Examples of the used thermoplastic include typical resins as follows: polyolefin resins such as polyethylene, polypropylene, propylene-ethylene copolymer, ethylene-propylen rubber (EPR), and ethylene-propylene-diene terpolymer (EPDM); styrene resins such as polystyrene, acrylonitrile-butadiene-styrene (ABS) resin, acrylonitrile-styrene-copolymer (AS) resin, (AXS) resin; polyamides such as nylon 6, nylon 6-6, nylon 6-10, nylon 6-12, nylon 12 and nylon MXD (aromatic polyamide); saturated polyesters such as polyethylene terephthalate and polybutylene terephthalate, acrylic resins, polycarbonate, polyoxymethylene (POM), polyphenylene oxide (PPO), polyphenylene sulfide (PPS), polysulfone, polyethersulfone, polyetherketone, and polyetheretherketone. Any one of these resins may be used as a copolymer or a derivative, or two or more kinds thereof may be used in a blend form.

In the case in which such a polyolefin which is nonpolar and is difficult to bond as polyethylene, polypropylene, propylene-ethylene copolymer is used as the matrix thermoplastics polymer, it is preferable for an improvement in the bonding strength to the glass fibers to add an appropriate amount of acid-modified polypropylene, polyethylene, ethylene-propylene-diene terpolymer (EPDM), or the like to the matrix thermoplastics polymer.

If as an acid for the modification there is used an unsaturated carbonic acid or an acid anhydride thereof such as (meth)acrylic acid, maleic acid (maleic anhydride), fumaric acid, itaconic acid (itaconic anhydride), or crotonic acid, the modification with the acid can be attained by copolymerization or the like. Derivatives such as esters, amides or metal salts of such acids may also be used. The modification with the acid may be attained by adding a peroxide and an acid anhydride to the polyolefin and then heating and reacting the blend in an extruder for producing a pellet. When polypropylene is used as the matrix thermoplastics polymer, it is recommendable to use maleic anhydride-modified polypropylene, which is obtained by graft-polymerizing polypropylene with maleic anhydride.

The acid-modified polyolefin may be caused to be present in a pellet by adopting, e.g., a method of blending the acid-modified polyolefin with polyolefin (a main component in the matrix thermoplastics polymer) so as to make up the acid-modified polyolefin to a part of the matrix thermoplastics polymer, or a method of forming a coating film of the acid-modified polyolefin on the surface of the glass fibers. In order to form the coating film, polyolefin of an emulsion type (or a solution type) may be applied by dip coating, spray coating or the like.

Depending on use of the molded product, known additives as follows may be added to the matrix thermoplastics polymer: modifiex such as a dispersant, a lubricant, a plasticizer, a flame retarder, an antioxidant, an anti-static agent, a light stabilizer, a UV absorber and a crystallization promoter (a nucleating agent); colorants such as a pigment or a dye; fillers in a particle form, such as carbon black, titanium oxide, talc, calcium carbonate, mica and clay; fillers in a fiber form, such as milled fiber and wollastonite; and whisker such as potassium titanate. These additives may be contained in a pellet by adding them to the pellet in the production thereof, or may be added to a hopper of an injection molding machine when a product is predicted from the pellet. It is preferable to add the above-mentioned particle-form filler in an amount of about 5 wt % of the total of the matrix thermoplastics polymer and the glass fibers. The wording "matrix thermoplastics polymer" herein means a blend of the thermoplastic resin and the above-mentioned additives.

The glass fibers which can be used are not especially limited. For example, E-glass or S-glass may be used. The diameter of the fibers is usually from 5 to 25 μm. If the glass fibers have a diameter of 5 μm or less, the fibers are easily damaged so that the productivity of the fibers tow is lowered. Moreover, many fibers must be bundled when pellets are continuously produced. Unfavorably, therefore, labor for connecting the glass fibers tow is troublesome and the productivity thereof is lowered. On the other hand, if the glass fibers have a diameter over 25 μm, the aspect ratio of the fibers is lowered on the basis of the fact that a preferable length of the pellet is specified. Thus, reinforcing effect is not sufficiently exhibited. More preferably, the diameter of the fibers ranges from 8 to 20 μm.

It is preferable for the production of the pellet to use a glass fiber tow (roving) wherein the glass fibers are bundles with a suitable bundling agent. Preferably, the number of the fiber tow ranges from 300 to 5000. Within this range, the tow is sufficiently impregnated with the thermoplastic resin. If the number is over 5000, the center of the fiber tow may not be unfavorably impregnated with the resin. More preferably, the number of the fiber tow ranges from 500 to 3000.

In order to improve wettability of the glass fibers to the matrix thermoplastics polymer, the glass fibers may be subjected to a known surface treatment. The surface treatment is conducted by applying various coupling agents such as silane, titanate, aluminum, chromium, zirconium or borane type coupling agents. The coupling agents excellent in the wettability to the thermoplastic resin are silane and titanate types. Especially preferable are silane coupling agents, the typical examples of which are aminosilanes such as γ-aminopropyltriethoxysilane; epoxysilanes such as γ-glycydoxypropyltrimethoxysilane; and vinylsilanes such as vinyltrichlorosilane.

The molded product of the present invention is a product obtained by molding the above-mentioned matrix thermoplastics polymer and glass fibers. The greatest characteristic thereof is that the amount of the glass fibers in the molded product is specified and the amount of the fibers having a large length is restricted to a specified value or less, so as to improve a surface nature and mechanical properties of the molded product.

In the fiber reinforced thermoplastic resin molded product of the present invention, the glass fibers must be contained in an amount of 2 to 20 vol % of the molded product. If the amount of the glass fibers is less than 2 vol %, reinforcing effect based on the fibers is not sufficient. If the amount is over 20 vol %, the glass fibers are projected from the surface of the product. As a result, unfavorably the surface nature deteriorates. Preferably, the lower limit and the upper limit of the content of the glass fibers are 4 vol % and 15 vol %, respectively. The requirements about the content of the glass fibers, the average length, and the like in the product of the present invention are related to neither blended amount nor length of fibers blended at the time of molding, but related to the content of the glass fibers and the length of the product after the molding.

Concerning the glass fibers contained in the product of the present invention, their weight average length (Lw) must be from 0.8 to 1.8 mm. If the glass fibers are shorter than 0.8 mm, reinforcing effect is not sufficiently exhibited and mechanical properties deteriorate. However, if the glass fibers are longer than 1.8 mm, in the case of a thin molded product the fiber may be projected from its surface. Moreover, its dispersibility deteriorates so that the fibers tow may be present. Thus, its surface appearance may become bad. Additionally, the deterioration of the dispersibility causes the following: the Izod impact value of the molded product varies considerably, depending on locations of the product. That is, when plural samples are sampled from molded products having an average-weight fiber length over 1.8 mm and then their mechanical properties such as their Izod impact values are measured, the scattering in the measured values is large among the plural samples. This demonstrates that since the dispersibility of the glass fibers in the molded product is non-uniform, the following arises: while the samples containing an appropriate amount of the glass fibers exhibit good impact values, the samples wherein the region containing less glass fibers is sampled exhibit lower impact values. Moreover, if there is a glass fiber bundle in the molded product, the Izod impact value at this place is larger than the value at the place where there is no fiber bundle, because fiber bundles affect the Izod impact value. From this standpoint, the upper limit of the weight average fiber length (Lw) is set up to 1.8 mm in the present invention. More preferably, the lower limit and the upper limit of the weight average fiber length (Lw) of the glass fibers are 0.9 mm and 1.6 mm, respectively.

The weight average fiber length (Lw) of glass fibers is a value obtained from the following equation when an image processor "LUZEX LF" (Nireco corporation) is used to measure respective lengths (Li) of about 2000–3000 glass fibers:

$Lw = L1 \times$ (the weight percentage (i.e., the weight fraction)

of fibers having a fiber length of $L1$)+$L2\times$ (the weight percentage of fibers having a fiber length of $L2$)+

$L3\times$(the weight percentage of fibers having a fiber length of $L3$)+
... +$Ln\times$ (the weight percentage of fibers having a fiber length of $Ln$)=
$\Sigma(Li \times Wi/100)$ wherein the actually-measured fiber length is represented by Li (i=1, 2, 3 . . . , n) , and the weight percentage of fibers having a fiber length of Li is represented by Wi (i=1, 2, 3 . . . , n).

The number-average fiber length is calculated from the following equation:

$Ln = \Sigma Li/n$

The weight percentage of fibers having a fiber length of 2 mm or more and that of fibers having a fiber length of 3 mm or more are also obtained from the above-mentioned measurement.

In the molded product of the present invention, the weight percentage of the glass fibers having a fiber length of 2 mm or more must be 20 or less wt % of all the glass fibers contained in the molded product. Even when the weight average fiber length (Lw) satisfies the defined range, the surface nature deteriorates and mechanical properties such as an impact value vary because of a drop in the dispersibility of the glass fibers if the percentage of the fibers having a length of 2 mm or more is over 20 wt % of all the glass fibers. Thus, such a case is unfavorable. From the same standpoint, the weight percentage of the glass fibers having a fiber length of 3 mm or more must be 5 or less wt %.

In order to obtain a molded product satisfying the above-mentioned requirements defined in the present invention, it is preferable to adopt a producing process in which the glass fibers can be sufficiently dispersed. For example, if there is adopted a process in which a part of a melted resin is, in a batch manner, put into a mold and glass fibers adjusted to satisfy the above-mentioned requirements are scattered thereto, a molded product of the present invention can be produced. According to this process, however, mass-production is impossible so that a high cost cannot be avoided.

Thus, the inventors have decided that the molded product of the present invention is obtained by injection molding, which makes mass-production possible, and then found a pellet making it possible that, when a molded product is obtained from the pellet through an injection molding step, the molded product satisfies the requirements defined in the present invention. In the present invention, there is adopted a process of blending a pellet which contains many glass fibers (a master pellet) and a matrix resin pellet which does not substantially contain any glass fiber but contains only a matrix thermoplastics polymer in a desired ratio and then molding the blend in order to change the amount of the glass fibers in the molded product easily in a molding step. The inventors have therefore succeeded in an improvement in the dispersibility of the glass fibers after the molding and the control of the length of the glass fibers in the molded product by defining an optimal formulation shape and structure of the master pellet and the blend ratio of the master pellet to the resin pellet.

The pellet (master pellet) of the present invention is a fiber reinforced thermoplastic resin pellet containing a thermoplastic resin as a matrix polymer and containing glass fibers as reinforcing fibers, wherein the length of the pellet is about 2 to 12 mm, the glass fibers having substantially the same length as the pellet is contained in an amount of 20 to 6 vol % of the total pellet, in the state of lined-up or twisted fibers along the longitudinal direction of the pellet, and $L/D^2$ is 0.45 or more and $L/D$ is from 1.1 to 6 wherein L represents the length of the pellet and D represents the diameter thereof.

The pellet of the present invention (referred to as a pellet A, hereinafter) becomes substantially columnar if the producing process as described later is adopted. The length of the pellet A is about 2 to 12 mm. As the pellet A is shorter, the dispersibility of the glass fibers in a melting and compounding step in the injection molding machine becomes better. However, in order to improve mechanical properties of the molded product, it is necessary that the glass fibers have some degree of length. In order to balance the two with each other and set up the weight average fiber length (Lw) of the glass fibers in the molded product to 0.8–1.8 mm, as described above, it has been found that the length of the glass fibers in the pellet should be set up to 2–12 mm. The glass fibers are pulled and arranged in the state of lined-up or twisted fibers in the pellet A so that the length of the glass fibers is substantially the same as that of the pellet A. In the present invention, therefore, the length of the pellet A is set up to 2–12 mm. Even if all of the pellets A used in a molding step do not have a length of 2–12 mm, the molded product of the present invention may be obtained. Thus, the length of the pellet is defined as "about" 2–12 mm.

The damage of the glass fibers cannot be avoided in an injection molding step. Thus, in the case that the length of the pellet A is less than 2 mm, the weight average fiber length of the glass fibers in the molded product unfavorably becomes smaller than 0.8 mm. However, if the length is over 12 mm, bridges between the pellets are caused in a hopper of an injection molding machine so that handling of the pellet A becomes difficult. Moreover, a great deal of long fibers having a length of 2 mm or more, or 3 mm or more remains in the molded product. Thus, such a case is unfavorable because of bad surface appearance. The lower limit of the length of the pellet A (glass fiber length) is more preferably 3 mm, and most preferably 4 mm. The upper limit thereof is more preferably 10 mm, and most preferably 9 mm. If a preferable producing process described later is used, the length of the glass fibers in the pellet becomes substantially equal to or somewhat longer than the length of the pellet. There may however be a case that glass fibers which are shorter than the pellet are incorporated into the pellet. Any pellet containing such fibers are also within the scope of the present invention.

The pellet A of the present invention is made up to a so-called long fiber reinforced thermoplastics pellet structure, which contains the glass fibers in the state of aligned or twisted fibers along the longitudinal direction of the pellet A, that is, in the state that the glass fiber tow is pulled and arranged. In this case, the length of the glass fibers in the pellet can easily be controlled, and a satisfactory length of the glass fibers can be kept in the molded product. Besides, the pellet can easily be produced. Preferably, the glass fibers should be "twisted" since the impregnation with the resin and resistance against buckling and rupture are improved. The twisted fibers are also effective for keeping the satisfactory length of the fibers since the twisted glass fibers are somewhat longer than the pellet.

The amount of the glass fibers in the pellet A is set up to 20–6 vol %. From the standpoint of the production-effectivity of the pellet per unit volume of the glass fibers, in each of the pellet the glass fibers are preferably contained in an amount of 20 or more vol %. Considering that the master pellet (pellet A) and the matrix resin pellet are mixed to produce a molded product having a predetermined amount of the glass fibers, the amount of the glass fibers can be more widely changed as a larger amount of the glass fibers is contained in the master pellet. However, if the amount of the blended glass fibers is over 60 vol %, the glass fibers tow is insufficiently impregnated with the matrix thermoplastics polymer and further the glass fibers may unfavorably fall apart from the pellet A, and thus the amount of the glass fibers should be set up to 25–50 vol %.

In the pellet A in a substantially columnar form, the relationships between the length of the pellet (L) and the diameter thereof (D) should be as follows: $L/D^2$ is 0.45 or more and $L/D$ is from 1.1 to 6. Since the amount of the glass fibers in the pellet A is high, if the diameter of the pellet A is far larger than the length thereof, that is, $L/D^2$ is smaller than 0.45, the pellet is easily broken and fuzz of the glass fibers is unfavorably raised on the surface of the pellet. Even when the pellet diameter D becomes large so that $L/D^2$ exceeds 0.45, if $L/D$ is less than 1.1, similarly the pellet is easily broken and fuzz of the glass fibers is raised on the surface of the pellet. On the other hand, if $L/D$ is over 6, the pellet gets slender and the pellet may easily be broken in a molding step, suffering from difficult control of the fiber length.

A preferable example of the process for producing the pellet A continuously is a process comprising the steps of:

immersing continuous long glass fibers tow into a melted matrix thermoplastics polymer bath and causing the tow to pass through the bath, thereby impregnating the glass fibers tow with the matrix resin, rotating the long glass fibers tow continuously around the center axis of the tow with a twister, thereby twisting the tow to prepare a fiber reinforced strand, and pulling out the fiber reinforced strand in which the twisted tow is impregnated with the matrix thermoplastics polymer, and cutting the strand into pieces having a predetermined length, thereby obtaining the pellet.

The step of twisting the tow is preferably performed at the same time of the step of impregnating the tow with the resin. Specifically, a melt resin is extruded from an extruder into a cross head to prepare a resin bath, and then a continuos and long glass fibers tow is pulled and arranged to pass through the resin bath. In the case, the impregnation and the twisting may be simultaneously performed by setting up a twister such as a twisting roller at the downstream of the cross head, and causing the tow to pass through the resin bath while twisting the tow. The glass fibers tow impregnated with the resin (fiber reinforced resin strand) is cooled and then is cut into pieces of 2–12 mm in length, so that the fiber reinforced thermoplastic resin pellet A can be obtained. Short fibers produced by breakdown of the glass fiber during the impregnation of the fibers with the resin are also twisted and involved in the tow by the twisting. Therefore, the occurrence frequency of any trouble based on cut fibers is reduced.

The pellet A is usually blended with a pellet which does not substantially contain any glass fiber but contains only a matrix thermoplastics polymer (pellet B), in use. The pellet A and the pellet B may be beforehand dry-blended so that the amount of the glass fibers is set up to 30 wt % of the total pellets. Such a blend is also included in the fiber reinforced thermoplastic resin pellet of the present invention. The pellet A is blended with the pellet B in the manner that A/B (weight ratio) is set up to 0.08 to 3. When the blend ratio is less than 0.08, the ratio of the pellet B to the pellet A is large. In this case, if the pellets are insufficiently kneaded in injection molding, the glass fibers cannot be uniformly dispersed. Thus, this case is unfavorable. Conversely, if A/B is over 3, the dispersibility deteriorates.

In the case that the pellet A is blended with the pellet B, it is preferable that the thermoplastic resin constituting the pellet A, that is, the matrix thermoplastics polymer of the pellet A, is made of a resin having a larger fluidity than the thermoplastic resin constituting the pellet B. The pellet A contains the glass fibers of a high concentration. Thus, the dispersibility of the glass fibers is better as the fluidity of the matrix thermoplastics polymer is lower. However, if the whole of the matrix thermoplastics polymer constituting a molded product is made of a resin having a high fluidity, resistances against impact and heat drop. This is because resins having a high fluidity generally have a low molecular weight. Accordingly, the dispersibility of the glass fibers and the strength of the product can be improved by selecting a resin having a high molecular weight, that is, exhibiting a low fluidity, as the matrix thermoplastics polymer of the pellet B.

A fluidity can be compared with another fluidity by using MFR (melt flow rate), MI (melt index), a melting viscosity or the like. If the matrix thermoplastics polymer of the pellets A and B is, for example, polypropylene (PP), it is preferable to set up MFR (g/10 minutes, conditions: temperature=230° C., load=2.16 kgf) of PP of the pellet A to two or more times (and preferably 3 or more times) as much as MFR of PP of the pellet B. MFR of PP of the pellet B may be appropriately selected under the consideration of the blend ratio thereof to the pellet A, the fluidity of the resin in the step of molding, and physical properties of the molded product, but is usually from 1 to 60, and preferably from 5 to 30.

The matrix thermoplastics polymers of the pellet A and the pellet B are preferablymade of the same polymer. However, it is permissible to use the pellets A and B whose matrix thermoplastics polymers are made of different polymers, if they are compatible with each other or can act as a polymer alloy to exhibit good properties.

The molded product of the present invention can be produced by injection-molding the pellets A and B in the manner that A/B (weight ratio) is made up to 0.08–3. A pellet blend wherein the pellet A and the pellet B are blended is introduced into a hopper of an injection molding machine, and then is melted in its injection unit while being subjected to screw-press, so as to be injected into a mold. Even when the requirements about the structure of the pellet A, the blend ratio of the pellet A to the pellet B, and the like, are defined within the scope described above, any molded product satisfying the requirements of the present invention may not be obtained if the conditions for injection molding are inappropriate. Thus, it is preferable to select the conditions experimentally. Other known producing processes may be used to obtain the molded product of the present invention.

EXAMPLES

The present invention will be more specifically described by way of Examples, hereinafter. However, the present invention is not restricted to Examples, and any alternation or modification made within the scope of the subject matter of the present invention are included in the scope of the present invention.

First, the following will describe materials used in Examples, Comparative Examples, and reference Examples.

[1] Matrix Resin

Each of glass fiber-containing pellets A was obtained by using each of the following a-1 to a-4 as a matrix thermoplastics polymer, and adding glass fibers described in Item [2] and an additive described in Item [3] to each of the resins, in a blend formulation shown into Tables 1–3. (Producing processes thereof will be described later.)

a-1: Crystalline polypropylene pellet [density=0.909 g/cm$^3$, MFR (measurement conditions: temperature=230° C., and load=2.16 kgf)=100 g/10 minutes]

a-2: Crystalline polypropylene pellet [density=0.909 g/cm$^3$, MFR (measurement conditions: temperature=230° C., and load=2.16 kgf)=60 g/10 minutes]

a-3: Crystalline polypropylene pellet [density=0.909 g/cm$^3$, MFR (measurement conditions: temperature=230° C., and load=2.16 kgf)=200 g/10 minutes]

a-4: Pellet or crushed pieces of maleic anhydride-modified polypropylene ("YOUMEX 1001" manufactured by Sanyo Chemical Industries, Ltd.) [density=0.95 g/cm$^3$, Molecular weight=40,000 (weight average molecular weight by GPC process), melting viscosity=16,000 cps (160° C.), acid value=26 mgKOH]

[2] Glass Fibers Tow (Roving)

Continuous tow of E-glass fibers having an average diameterof 13 µm and 650 tex was surface-treated with a silane coupling (γ-aminopropyltriethoxysilane), and then was surface-treated with a maleic anhydride-modified polypropylene emulsion. The resultant was used. In the glass fiber-containing pellet A-12, chopped glass fibers cut into pieces of 6 mm in length were used.

[3] Additive b-1: titanium oxide having a Mhos' hardness of 6–7 and an average particle size of 0.25 µm.
b-2: zinc oxide having a Mhos' hardness of 4–4.5 and an average particle size of 0.5 µm.
b-3: zinc sulfide having a Mhos' hardness of 3.5 and an average particle size of 0.5 µm.
b-4: calcium carbonate having a Mhos' hardness of 3–3.5 and an average particle size of 0.15 µm.

[4] Pellet B

As the pellet B not containing any glass fibers, pellets described below were used. The content of the Y unit described below was gained by calculation from the weight obtained by immersing 2 g of a block copolymer into 300 g of boiling xylene for 20 minutes to dissolve the copolymer in the xylene, cooling the solution to room temperature, filtering the precipitated solid phase with a glass filter, and drying the solid phase.

B-1: propylene-ethylene block copolymer composed of 90 wt % of a crystalline polypropylene unit (X unit) having a density of 0.909 g/cm$^3$, and 10 wt % of propylene-ethylene random copolymer unit (Y unit) whose ethylene content was 39 wt %, and having, as a whole, MFR (measurement conditions: temperature=230° C., and a load=2.16 kgf) of 6.5 g/10minutes.

B-2: propylene-ethylene block copolymer composed of 90 wt % of a crystalline polypropylene unit (X unit) having a density of 0.909 g/cm$^3$, and 10 wt % of propylene-ethylene random copolymer unit (Y unit) whose ethylene content was 39 wt %, and having, as a whole, MFR (measurement conditions: temperature=230° C., and a load=2.16 kgf) of 15 g/10 minutes.

B-3: propylene-ethylene block copolymer composed of 90 wt % of a crystalline polypropylene unit (X unit) having a density of 0.909 g/cm$^3$, and 10 wt % of propylene-ethylene random copolymer unit (Y unit) whose ethylene content was 39 wt %, and having, as a whole, MFR (measurement conditions: temperature=230° C., and a load=2.16 kgf) of 30 g/10 minutes.

B-4: propylene-ethylene block copolymer composed of 90 wt % of a crystalline polypropylene unit (X unit) having a density of 0.909 g/cm$^3$, and 10 wt % of propylene-ethylene random copolymer unit (Y unit) whose ethylene content was 39 wt %, and having, as a whole, MFR (measurement conditions: temperature=230° C., and a load=2.16 kgf) of 60 g/10 minutes.

Examples 1–20 and Comparative Examples 1–14

Each of the matrix thermoplastics polymers a and each of the additives b were blended into a formulation shown in Tables 1–3, to prepare a melted bath. Subsequently, a continuous glass fiber roving was twisted and simultaneously caused to pass through the melted resin bath to impregnate the roving with the resin (see Japanese Patent Application Laid-Open No. 5-169445). Thus, a glass fiber reinforced resin prepreg having a diameter shown in the corresponding table was prepared. The resultant prepreg was cut with a strand cutter to prepare a pellet shown in the corresponding table (a glass fiber-containing pellet A). A-12 was a pellet obtained by cutting the glass fiber roving beforehand into pieces of 6 mm in length to prepare a chopped glass, using the chopped glass to dry-blend the matrix thermoplastics polymer pellet and the additive shown in Table 3, and melting and compounding the blend in a uniaxial extruder. In some kinds of resins, when their density changes, the percentage by volume of glass fibers changes. For convenience' sake, therefore, all of the blended amounts are represented by using the unit "wt %".

The glass fiber-containing pellet A and the pellet B not containing any glass fiber were dry-blended at a ratio shown in Tables 3–8. The blend was molded with an injection machine "JSW J200SA" (manufactured by The Japan Steel Works, Ltd.) into a test piece for measuring mechanical properties (JIS standard) and a flat plate (130×100×3 mm (thickness)). Their physical properties were measured by the following measuring methods. The results are shown in Tables 4–8.

1. Flexural Strength and Flexural Modulus

They were measured according to JIS K 7203. The temperature for the measurement was set up to 23° C.

2. Izod Impact Value (with a Notch)

It was measured according to JIS K 7110. The thickness of the test piece was set up to 4 mm. The temperature for the measurement was set up to 23° C. A coefficient of variation was a value of (standard deviation/absolute value of the average value) ×100%.

3. Surface Roughness

It was measured according to JIS B 0601. In the present invention, the surface roughness was not obtained from the roughness curve of a unit length for measurement, but a parameter of the roughness curved-surface in a unit area for measurement (a central surface) and a height of the area surrounded by the central surface (a height along the Z direction), as an average roughness of the central surface).

4. Glass Fiber Length (the Length of Glass Fibers in a Molded Product)

Glass fibers remaining after the molded product was burnt to ashes were dispersed in water to which a surfactant was added, in an ultrasonic cleaner, and then the glass fibers were passed through a 1 mm sieve to separate into passed fibers and non-passed fibers. The weight of each of the two fibers was measured after it was dried. Each of the two glass fibers was again dispersed in water and then transferred to a petri dish. It was moved to the field of vision of an optical microscope, and observed at a suitable magnification. An image processor ("LUZEX LF" [Nireco corporation]) was used to measure the length (Li) of about 2000–3000 of the glass fibers. The weight average fiber length (Lw) and the number-average fiber length (Ln) were calculated as follows.

$Lw=L1\times$(the weight percentage of fibers having a fiber length of $L1$)+$L2\times$ (the weight percentage of fibers having a fiber length of $L2$)+$L3\times$ (the weight percentage of fibers having a fiber length of $L3$)+ . . . +$Ln\times$ (the weight percentage of fibers having a fiber length of $Ln$)= $\Sigma(Li\times Wi/100)$ wherein the actually-measured fiber length is represented by Li (i=1, 2, 3 . . . , n), and the weight percentage of fibers having a fiber length of Li is represented by Wi (i=1, 2, 3 . . . , n).

The number-average fiber length (Ln) is calculated from the following equation:

$Ln=\Sigma Li/n$

The weight percentage of fibers having a fiber length of 2 mm or more and that of fibers having a fiber length of 3 mm or more were also obtained. They are also shown in Tables 3–8.

5. Dispersibility of the Glass Fibers

The flat plate (130×100×30 mm (thickness)) was molded with a direct gate having a diameter of 3 mm, and then a soft X-ray photograph of the resultant molded product was taken to examine the state of the contained glass fibers, that is, whether or not there was a lump of the glass fibers which was not disentangled. The product having one or more lump was represented as x, and the product not having any lump was represented as ○.

TABLE 1

| | | Glass fiber-contairnng peilet (A) | | | | | | | |
|---|---|---|---|---|---|---|---|---|---|
| | | A-1 | A-2 | A-3 | A-4 | A-5 | A-6 | A-7 | A-8 |
| Formulation | Matrix thermoplastics polymer | | | | | | | | |
| | a-1 | 47.9 | 47.0 | 45.0 | 43.0 | 23.2 | 56.0 | 50.5 | 48.0 |
| | a-4 | 2.0 | 2.0 | 2.0 | 2.0 | 2.8 | 1.6 | 1.8 | 2.0 |
| | Glass fibers | 50 | 50 | 50 | 50 | 70 | 40 | 45 | 50 |
| | Additive | | | | | | | | |
| | b-1 | 0.1 | — | — | — | — | — | — | — |
| | b-2 | — | 1.0 | — | — | — | — | — | — |
| | b-3 | — | — | 3.0 | — | 4.0 | 2.4 | 2.7 | — |
| | b-4 | — | — | — | 5.0 | — | — | — | — |
| Pellet | Pellet length (mm) | 8.0 | 8.0 | 8.0 | 8.0 | 8.0 | 8.0 | 8.0 | 8.0 |
| | Pellet diameter (mm) | 3.0 | 3.0 | 3.0 | 3.0 | 3.0 | 3.0 | 3.0 | 3.0 |
| | $L/D$ | 2.7 | 2.7 | 2.7 | 2.7 | 2.7 | 2.7 | 2.7 | 2.7 |
| | $L/D^2$ | 0.90 | 0.90 | 0.90 | 0.90 | 0.90 | 0.90 | 0.90 | 0.90 |
| | Cracks, or fuzz | None | None | None | None | None | None | None | None |

TABLE 2

| | | Glass fiber-containing pellet (A) | | | | | | | | |
|---|---|---|---|---|---|---|---|---|---|---|
| | | A-9-1 | A-9-2 | A-9-3 | A-9-4 | A-9-5 | A-9-6 | A-9-7 | A-9-8 | A-9-9 |
| Formultion | Matrix thermoplastics polymer | | | | | | | | | |
| | a-1 | 45.0 | 45.0 | 45.0 | 45.0 | 45.0 | 45.0 | 45.0 | 45.0 | 45.0 |
| | a-4 | 2.0 | 2.0 | 2.0 | 2.0 | 2.0 | 2.0 | 2.0 | 2.0 | 2.0 |
| | Glass fibers | 50 | 50 | 50 | 50 | 50 | 50 | 50 | 50 | 50 |
| | Additive b-3 | 3.0 | 3.0 | 3.0 | 3.0 | 3.0 | 3.0 | 3.0 | 3.0 | 3.0 |
| Pellet | Pellet length (mm) | 3.0 | 3.0 | 4.0 | 8.0 | 12 | 6.0 | 8.0 | 10 | 3.0 |
| | Pellet diameter (mm) | 1.5 | 2.0 | 2.0 | 2.0 | 2.0 | 3.0 | 1.0 | 1.5 | 3.0 |
| | $L/D$ | 2.0 | 1.5 | 2.0 | 4.0 | 6.0 | 2.0 | 8.0 | 6.7 | 1.0 |
| | $L/D^2$ | 1.33 | a.75 | 1.00 | 2.00 | 3.00 | 0.66 | 8.00 | 4.46 | 0.33 |
| | Cracks, or fuzz | None | None | None | None | None | None | None | None | Existense |

| | | Glass fiber-containing pellet (A) | | | | | | |
|---|---|---|---|---|---|---|---|---|
| | | A-9-10 | A-9-11 | A-9-12 | A-9-13 | A-9-14 | A-9-15 | A-9-16 | A-9-17 |
| Formulation | Matrix thermoplastics polymer | | | | | | | | |
| | a-1 | 45.0 | 45.0 | 45.0 | 45.0 | 45.0 | 45.0 | 45.0 | 45.0 |
| | a-4 | 2.0 | 2.0 | 2.0 | 2.0 | 2.0 | 2.0 | 2.0 | 2.0 |
| | Glass fibers | 50 | 50 | 50 | 50 | 50 | 50 | 50 | 50 |
| | Additive b-3 | 3.0 | 3.0 | 3.0 | 3.0 | 3.0 | 3.0 | 3.0 | 3.0 |
| Pellet | Pellet length (mm) | 4.0 | 15 | 7.0 | 13 | 13 | 2.3 | 2.1 | 3.0 |
| | Pellet diameter (mm) | 3.0 | 3.0 | 5.0 | 5.0 | 4.0 | 2.0 | 2.0 | 2.5 |
| | $L/D$ | 1.3 | 5.0 | 1.4 | 2.6 | 3.3 | 1.15 | 1.05 | 1.2 |
| | $L/D^2$ | 0.43 | 1.66 | 0.28 | 0.52 | 0.83 | 0.57 | 0.52 | 0.48 |
| | Cracks, or fuzz | Existense | None | Existense | None | None | None | Existense | None |

TABLE 3

| | | Glass fiber-containing pellet (A) | | |
|---|---|---|---|---|
| | | A-10 | A-11 | A-12 |
| Formulation | Matrix thermoplastics polymer | | | |
| | a-1 | — | — | 45.0 |
| | a-2 | 45.0 | — | — |
| | a-3 | — | 45.0 | — |
| | a-4 | 2,O | 2.0 | 2.0 |
| | Glass fibers | 50 | 50 | 50 (chopped) |
| | Additive b-3 | 3.0 | 3.0 | 3.0 |
| Pellet | Pellet length (mm) | 8.0 | 8.0 | 8.0 |
| | Pellet diameter (mm) | 3.0 | 3.0 | 3.0 |
| | L/D | 2.7 | 2.7 | 2.7 |
| | L/D$^2$ | 0.90 | 0.90 | 0.90 |
| | Cracks, or fuzz | None | None | None |

TABLE 4

| | | | Example | | | | | |
|---|---|---|---|---|---|---|---|---|
| | | | 1 | 2 | 3 | 4 | 5 | 6 |
| Blend | Pellet A | A-1 | 40 | — | — | — | — | — |
| | | A-2 | — | 40.0 | — | — | — | — |
| | | A-3 | — | — | 40.0 | — | — | — |
| | | A-4 | — | — | — | 40.0 | — | — |
| | | A-5 | — | — | — | — | 42.8 | 14.3 |
| | | A-8 | — | — | — | — | — | — |
| | Pellet B-1 | | 60.0 | 60.0 | 60.0 | 60.0 | 57.2 | 85.7 |
| | Blend ratio: A/B | | 0.67 | 0.67 | 0.67 | 0.67 | 0.75 | 0.17 |
| Results | Flexural strength (kg/mm$^2$) | | 11.8 | 12.3 | 12.6 | 12.3 | 14.7 | 9.8 |
| | Flexural Modulus (kg/mm$^2$) | | 472 | 471 | 473 | 470 | 590 | 295 |
| | Notched Izod impact (kgcm/cm$^2$) | | 12.5 | 12.3 | 15.5 | 16.2 | 19.5 | 10.9 |
| | Coefficient of variation (%) (Izod impact) | | 3.5 | 4.1 | 4.6 | 5.0 | 4.0 | 3.8 |
| | Surface roughness (nm) | | 290 | 300 | 300 | 300 | 330 | 280 |
| | Weight average fiber length Lw (mm) | | 1.10 | 1.25 | 1.31 | 1.55 | 1.22 | 1.15 |
| | Lw/Ln | | 1.3 | 1.4 | 1.5 | 1.5 | 1.5 | 1.3 |
| | Content of fibers of 2 mm or more in length (wt %) | | 7.5 | 12.3 | 12.1 | 17.3 | 11.6 | 9.8 |
| | Content of fibers of 3 mm or more in length (wt %) | | 1.3 | 3.1 | 4.2 | 4.1 | 3.5 | 2.2 |
| | Dispersiblity of fibers (with eyes) | | ○ | ○ | ○ | ○ | ○ | ○ |

| | | | Comparative Example | | | |
|---|---|---|---|---|---|---|
| | | | 1 | 2 | 3 | 4 |
| Blend | Pellet A | A-1 | — | — | — | — |
| | | A-2 | — | — | — | — |
| | | A-3 | — | — | — | — |
| | | A-4 | — | — | — | — |
| | | A-5 | — | — | — | 64.3 |
| | | A-8 | 60.0 | 40.0 | 20.0 | — |
| | Pellet B-1 | | 40. | 60.0 | 80.0 | 35.7 |
| | Blend ratio A/B | | 1.5 | 0.67 | 0.25 | 1.8 |
| Results | Flexural strength (kg/mm$^2$) | | 14.9 | 12.2 | 9.7 | 18.8 |
| | Flexural Modulus (kg/mm$^2$) | | 588 | 468 | 292 | 886 |
| | Notched Izod impact (kgcm/cm$^2$) | | 20.8 | 18.2 | 10.7 | 35.3 |
| | Coefficient of variation (%) (Izod impact) | | 8.0 | 10.2 | 7.5 | 14.3 |
| | Surface roughness (mm) | | 340 | 310 | 280 | 900 |
| | Weight average fiber length Lw (mm) | | 1.75 | 2.49 | 1.58 | 3.44 |
| | Lw/Ln | | 1.7 | 1.6 | 1.7 | 1.5 |
| | Content of fibers of 2 mm or more in length (wt %) | | 30.1 | 52.3 | 18.5 | 69.8 |
| | Content of fibers of 3 mm or more in length (wt %) | | 16.5 | 28.5 | 8.3 | 51.2 |
| | Dispersibility of fibers (with eyes) | | x | x | x | x |

TABLE 5

| | | | Example | | | | | | | |
|---|---|---|---|---|---|---|---|---|---|---|
| | | | 7 | 8 | 9 | 10 | 11 | 12 | 13 | 14 |
| Blend | Pellet A | A-9-1 | 40.0 | — | — | — | — | — | — | — |
| | | A-9-2 | — | 40.0 | — | — | — | — | — | — |
| | | A-9-3 | — | — | 40.0 | — | — | — | — | — |
| | | A-9-4 | — | — | — | 40.0 | — | — | — | — |
| | | A-9-5 | — | — | — | — | 40.0 | — | — | — |
| | | A-9-6 | — | — | — | — | — | 40.0 | — | — |
| | | A-9-15 | — | — | — | — | — | — | 40.0 | — |
| | | A-9-17 | — | — | — | — | — | — | — | 40.0 |
| | Pellet B-1 | | 60.0 | 60.0 | 60.0 | 60.0 | 60.0 | 60.0 | 60.0 | 60.0 |
| | Blend ratio A/B | | 0.67 | 0.67 | 0.67 | 0.67 | 0.67 | 0.67 | 0.67 | 0.67 |

TABLE 5-continued

| | | Example | | | | | | | |
|---|---|---|---|---|---|---|---|---|---|
| | | 7 | 8 | 9 | 10 | 11 | 12 | 13 | 14 |
| Results | Flexural strength (kg/mm²) | 11.8 | 12.0 | 12.0 | 12.6 | 12.1 | 12.5 | 11.8 | 11.9 |
| | Flexural Modulus (kg/mm²) | 471 | 473 | 470 | 471 | 470 | 472 | 472 | 472 |
| | NotchedIzod impact (kgcm/cm²) | 10.0 | 10.2 | 11.5 | 14.6 | 13.8 | 15.1 | 9.8 | 10.1 |
| | Coefficientof variation (%) (Izod impact) | 2.8 | 3.1 | 3.5 | 3.7 | 4.5 | 4.2 | 2.8 | 2.9 |
| | Surface roughness (nm) | 290 | 290 | 300 | 300 | 300 | 300 | 300 | 290 |
| | Weight average fiber length Lw (mm) | 0.91 | 0.95 | 1.05 | 1.27 | 1.23 | 1.30 | 0.85 | 0.97 |
| | Lw/Ln | 1.4 | 1.4 | 1.3 | 1.4 | 1.5 | 1.4 | 1.3 | 1.4 |
| | Content of fibers of 2 mm or more in length (wt %) | 2.1 | 2.5 | 5.2 | 12.5 | 13.5 | 12.2 | 1.9 | 2.9 |
| | Content of fibers of 3 mm or more in length (wt %) | 0 | 0 | 0.3 | 2.9 | 2.8 | 3.3 | 0 | 0 |
| | Dispersibility of fibers (with eyes) | ○ | ○ | ○ | ○ | ○ | ○ | ○ | ○ |

TABLE 6

| | | | Comparative Example | | | | | |
|---|---|---|---|---|---|---|---|---|
| | | | 5 | 6 | 7 | 8 | 9 | 10 |
| Blend | Pellet A | A-9-7 | 40.0 | — | — | — | — | — |
| | | A-9-8 | — | 40.0 | — | — | — | — |
| | | A-9-11 | — | — | 4.0 | — | — | — |
| | | A-9-12 | — | — | — | 40.0 | — | — |
| | | A-9-13 | — | — | — | — | 40.0 | — |
| | | A-9-14 | — | — | — | — | — | 40.0 |
| | Pellet B-1 | | 60.0 | 60.0 | 60.0 | 60.0 | 60.0 | 60.0 |
| | Blend ratio A/B | | 0.67 | 0.67 | 0.67 | 0.67 | 0.67 | 0.67 |
| Results | Flexural strength (kg/mm²) | | 11.5 | 11.3 | 11.8 | 11.5 | 11.7 | 12.0 |
| | Flexural Modulus (kg/mm²) | | 470 | 472 | 471 | 470 | 475 | 474 |
| | Notched Izod impact (kgcm/cm²) | | 7.8 | 7.5 | 18.3 | 27.9 | 17.5 | 16.4 |
| | Coefficientof variation (%) (Izod impact) | | 2.7 | 2.8 | 8.3 | 8.5 | 9.2 | 7.8 |
| | Surface roughness (nm) | | 310 | 320 | 350 | 340 | 320 | 310 |
| | Weight average fiber length Lw (mm) | | 0.78 | 0.75 | 1.85 | 2.46 | 2.62 | 2.43 |
| | Lw/Ln | | 1.3 | 1.3 | 1.6 | 1.6 | 1.5 | 1.5 |
| | Content of fibers of 2 mm or more in length (wt %) | | 0.8 | 0.5 | 32.3 | 53.1 | 55.1 | 50.5 |
| | Content of fibers of 3 mm or more in length (wt %) | | 0 | 0 | 16.4 | 20.4 | 29.1 | 26.5 |
| | Dispersibility of fibers (with eyes) | | ○ | ○ | x | x | x | x |

TABLE 7

| | | | Example | | | | Comparative Example | |
|---|---|---|---|---|---|---|---|---|
| | | | 15 | 16 | 17 | 18 | 11 | 12 |
| Blend | Pellet A | A-3 | — | — | 64.0 | — | — | — |
| | | A-5 | — | 8.6 | — | — | 7.2 | — |
| | | A-6 | 12.5 | — | — | — | — | 80.0 |
| | | A-7 | — | — | — | 66.7 | — | — |
| | Pellet B-1 | | 87.5 | 91.4 | 36.0 | 33.3 | 92.8 | 20.0 |
| | Blend ratio A/B | | 0.14 | 0.09 | 1.178 | 2.00 | 0.077 | 4.00 |
| Results | Flexural strength (kg/mm²) | | 6.7 | 7.0 | 15.0 | 14.5 | 6.1 | 14.3 |
| | Flexural Modulus (kg/mm²) | | 192 | 205 | 595 | 587 | 185 | 585 |
| | Notched Izod impact (kgcm/cm²) | | 10.5 | 10.1 | 19.8 | 19.3 | 7.0 | 17.5 |
| | Coefficient of variation (%) (Izod impact) | | 3.6 | 3.5 | 3.8 | 3.7 | 3.3 | 3.5 |
| | Surface roughness (nm) | | 270 | 270 | 330 | 330 | 270 | 330 |
| | Weight average fiber length Lw (mm) | | 1.10 | 0.98 | 1.35 | 1.38 | 0.78 | 1.40 |
| | Lw/Ln | | 1.4 | 1.4 | 1.5 | 1.5 | 1.3 | 1.5 |
| | Content of fibers of 2 mm or more in length (wt %) | | 6.5 | 2.8 | 15.8 | 16.0 | 1.2 | 16.3 |
| | Content of fibers of 3 mm or more in length (wt %) | | 1.8 | 0.2 | 4.5 | 4.5 | 0 | 4.6 |
| | Dispersibility of fibers (with eyes) | | ○ | ○ | ○ | ○ | ○ | ○ |

TABLE 8

|       |             |      | Example |      |      |      | Comparative Example |      |
|-------|-------------|------|---------|------|------|------|---------------------|------|
|       |             |      | 19      | 20   | 21   | 22   | 13                  | 14   |
| Blend | Pellet A    | A-3  | 40.0    | 40.0 | —    | —    | 40.0                | —    |
|       |             | A-10 | —       | —    | 40.0 | —    | —                   | —    |
|       |             | A-11 | —       | —    | —    | 40.0 | —                   | —    |
|       |             | A-12 | —       | —    | —    | —    | —                   | 40.0 |
|       | Pellet B    | B-1  | —       | —    | —    | —    | —                   | 60.0 |
|       |             | B-2  | 60.0    | —    | —    | —    | —                   | —    |
|       |             | B-3  | —       | 60.0 | 60.0 | —    | —                   | —    |
|       |             | B-4  | —       | —    | —    | 60.0 | 60.0                | —    |
|       | Blend ratio A/B |  | 0.67 | 0.67 | 0.67 | 0.67 | 0.67 | 0.67 |
| Results | Flexural strength (kg/mm$^2$) | | 12.3 | 12.0 | 12.0 | 11.9 | 12.1 | 11.5 |
|       | Flexural Modulus (kg/mm$^2$) | | 471 | 472 | 470 | 468 | 470 | 470 |
|       | Notched Izod impact (kgcm/cm$^2$) | | 15.2 | 15.8 | 15.5 | 14.7 | 16.1 | 6.1 |
|       | Coefficient of variation (%) (Izod impact) | | 4.5 | 4.2 | 4.7 | 4.6 | 7.2 | 2.6 |
|       | Surface roughness (nm) | | 300 | 300 | 310 | 310 | 340 | 350 |
|       | Weight average fiber length Lw (mm) | | 1.41 | 1.50 | 1.55 | 1.53 | 1.65 | 0.67 |
|       | Lw/Ln       |      | 1.5 | 1.6 | 1.6 | 1.6 | 1.65 | 1.2 |
|       | Content of fibers of 2 mm or more in length (wt %) | | 16.3 | 18.5 | 19.2 | 19.1 | 22.6 | 0 |
|       | Content of fibers of 3 mm or more in length (wt %) | | 4.3 | 4.5 | 4.8 | 4.9 | 7.6 | 0 |
|       | Dispersibility of fibers (with eyes) | | ○ | ○ | ○ | ○ | x | ○ |

Examples 1–20 according to the present invention had satisfactory strength, elasticity modulus, Izod impact value and the like, and a small scattering in the Izod impact value. Moreover, their surface roughness was small, and their dispersibility of the fibers was good. Thus, it can be understood that the glass fibers having an appropriate length were uniformly contained.

In Comparative Examples 1 and 2 in Table 4, the amounts (wt %) of the fibers having a length of 2 mm or more and of the fibers having a length of 3 mm or more were large. In Comparative Example 3, the amount of the fibers having a length of 3 mm or more was large. These did not satisfy the requirements of the molded product of the present invention. As a result, their surface roughness was substantially equal to that of Examples, but the dispersibility of the fibers was poorer that that of Examples. The scattering in the impact value was also large. It appears that this was based on the fact that molding conditions were inappropriate. In Comparative Example 4, the blended amount of the glass fibers was 22.8 vol % (45 wt %), and was over the value defined as the requirement of the present invention (20 vol %). Thus, the glass fibers were projected from the surface, so that its surface roughness deteriorated extremely.

Comparative Examples 5 and 6 in Table 6 were examples wherein their weight average fiber length was insufficient. It appears that this resulted from rapture of the glass fibers in the injection molding step since L/D of the pellets was larger than 6. In the pellets having L/D$^2$ of less than 0.45, or L/D of less than 1.1, that is, A-9-9. A-9-10, A-9-12, and A-9-16 in Table 2, cracks of the pellets were generated and fuzz was raised. It can be understood, in particular from the result of A-9-16, that even if L/D$^2$ is 0.45 or more, a good pellet cannot be obtained if L/D is less than 1.1.

All of Comparative Examples 7–10 were examples wherein many long fibers were contained, so that the dispersibility of the fibers was poor and the scattering in the impact value was large. It can be considered that this resulted from poor dispersibility of the fibers because of the following reasons: in Comparative Examples 7, 9 and 10, too long pellets were used, and in Comparative Example 8, the diameter of the pellet was larger and thus L/D$^2$ was less than 0.45.

In Comparative Example 11 in Table 7, the amount of the glass fibers was small, and the weight average length was also small. Therefore, its impact value was low, and the molded product was not practicable. In Comparative Example 12, the blend ratio of the pellet A to the pellet B was over 3. For this reason, the glass fibers were contained in a large amount of 14.4 vol % (32 wt %), but Comparative Example 12 was poorer than Example 18 wherein the glass fibers were contained in an amount of 13.3 vol % (30 wt %), in the impact value and the like. It can be considered that rapture of the glass fibers arose.

In Comparative Example 13 in Table 8, many long fibers were contained so that the dispersibility thereof was bad. It can be considered that this resulted from poor dispersibility of the glass fibers because of larger MFR of the pellet B-4 MFR of matrix resin of A-3 is smaller than twice of MFR of matrix resin of B-4. In Comparative Example 14, the short fiber reinforced thermoplastics pellet A-12 using chopped glass fibers was used. In the molded product, therefore, its weight average fiber length was short and its mechanical strength was low.

What is claimed is:

1. A fiber reinforced thermoplastic resin molded product comprising a thermoplastic resin as a matrix polymer and glass fibers as reinforcing fibers, and having a good surface appearance,
   wherein the glass fibers are contained in an amount of 2 to 20 vol % of the molded product, the weight average fiber length of the glass fibers present in the molded product is from 0.8 to 1.8 mm, the glass fibers of 2 mm or more in length are contained in an amount of 20 or less wt % of the total glass fibers, and the glass fibers of 3 mm or more in length are contained in an amount of 5 or less wt % of the total glass fibers.

2. A fiber reinforced thermoplastic resin pellet comprising a thermoplastic resin as a matrix polymer and glass fibers as reinforcing fibers, wherein the length of the pellet is about 2 to 12 mm, the glass fibers having substantially the same length as the pellet is contained in an amount of 20 to 60 vol % of the total pellet, in the state of aligned or twisted fibers along the longitudinal direction of the pellet, and $L/D^2$ is 0.45 or more and $L/D$ is from 1.1 to 6 wherein L represents the length of the pellet and D represents the diameter thereof.

3. A fiber reinforced thermoplastic resin pellet wherein the fiber reinforced thermoplastic resin pellet A according to claim 2 is mixed with a thermoplastic resin pellet B which does not substantially contain any glass fiber, in the manner that the weight ratio of A to B is from 0.08 to 3.

4. A process for producing the fiber reinforced thermoplastic resin molded product according to claim 3, wherein the fiber reinforced thermoplastic resin pellet A comprising a thermoplastic resin as a matrix polymer and glass fibers as reinforcing fibers, wherein the length of the pellet is about 2 to 12 mm, the glass fibers having substantially the same length as the pellet is contained in an amount of 20 to 60 vol % of the total pellet, in the state of aligned or twisted fibers along the longitudinal direction of the pellet, and $L/D^2$ is 0.45 or more and $L/D$ is from 1.1 to 6 wherein L represents the length of the pellet and D represents the diameter thereof, is mixed with a thermoplastic resin pellet B which does not substantially contain any glass fiber, in the manner that the weight ratio of A to B is from 0.08 to 3, and then the blend is injection-molded.

5. A process according to claim 4, wherein a thermoplastic resin constituting the fiber reinforced thermoplastic resin pellet A flows more easily than a thermoplastic resin constituting the thermoplastic resin pellet B which does not substantially contain any glass fiber.

6. A process for producing the fiber reinforced thermoplastic resin pellet A according to claim 2 continuously, comprising the steps of:

immersing continuos long glass fibers tow into a melted matrix thermoplastics polymer bath and causing the tow to pass through the bath, thereby impregnating the glass fibers tow with the matrix thermoplastics polymer, rotating the long glass fibers tow continuously around the center axis of the tow with a twister, thereby twisting the tow to prepare a fiber reinforced strand, and pulling out the fiber reinforced strand in which the twisted tow is impregnated with the matrix thermoplastics polymer, and cutting the strand into pieces having a predetermined length, thereby obtaining the pellet.

* * * * *